US005421073A

United States Patent [19]

Johnson et al.

[11] Patent Number: 5,421,073

[45] Date of Patent: Jun. 6, 1995

[54] TOOL FOR REMOVING SPIRAL COIL SPRINGS

[75] Inventors: Joseph M. Johnson, Pleasant Ridge; Jerome F. Kamyszek, Warren, both of Mich.

[73] Assignee: General Motors Corporation, Detroit, Mich.

[21] Appl. No.: 224,645

[22] Filed: Apr. 7, 1994

[51] Int. Cl.6 ........ B23P 19/04

[52] U.S. Cl. ........ 29/228; 81/418; 81/426.5

[58] Field of Search ........ 81/418, 424.5, 426, 81/426.5, 487; 29/228, 229, 225, 268

[56] References Cited

U.S. PATENT DOCUMENTS

| | | | |
|---|---|---|---|
| 1,358,878 | 11/1920 | Rinn, Jr. . | |
| 1,361,548 | 12/1920 | Rinn, Jr. . | |
| 1,450,069 | 3/1923 | Fick | 29/228 |
| 1,513,827 | 11/1924 | Kent . | |
| 1,529,385 | 3/1925 | Anderson . | |
| 2,226,132 | 12/1941 | Tuisku . | |
| 3,119,597 | 1/1964 | Stephens | 81/487 |
| 4,183,268 | 1/1980 | Anderson . | |
| 4,776,079 | 10/1988 | Cameron | 81/426.5 |
| 4,841,821 | 6/1989 | Cooper | 81/426 |

*Primary Examiner*—Robert C. Watson
*Attorney, Agent, or Firm*—Ernest E. Helms

[57] ABSTRACT

A tool for use in an automotive window regulator assembly is provided enabling a spring of the regulator assembly to be readily installed or removed by a mechanic or a technician.

1 Claim, 5 Drawing Sheets

TOOL FOR REMOVING SPIRAL COIL SPRINGS

FIELD OF THE INVENTION

The field of the present invention relates to a tool for removing spiral coil springs. More particularly, the present invention relates to a tool for use in an automobile window regulator assembly, enabling the spring of the assembly to be readily installed or removed by a mechanic or a technician.

BACKGROUND OF THE INVENTION

Automobile window regulator assemblies employ a spring which counterbalances the weight of the window when the window is cranked up or down, either manually or by a powered winding mechanism. Replacement of the springs has been found to be necessary, for example, the springs prove to be noisy or malfunction. Further, in order to replace other parts in the window winding mechanism, such as a motor, it is first necessary to remove the regulator spring.

Due to the strength of the coil spring and lack of room within the framework of the door, counterbalance springs have previously been extremely difficult to remove or install using conventional tools. Also, removal and installation of the springs in a conventional manner using conventional tools could possibly result in injury to the mechanic or technician if the spring is not properly handled or if the spring is not removed before beginning work on the window assemblies.

Accordingly, it is desirable to provide a specialized tool for use in window regulator assemblies which firmly holds the spring in a safe manner during removal and replacement of the spring. It is also desirable that the tool be simple in construction and operation so that the tool is economical to make and use, as well as compact and readily manipulated in the tight space in which it is employed.

Prior to the present invention, a tool for removal and installation of the counterbalance spring in a window regulator assembly included a base and a finger, each of which terminated in a pair of opposed vice members. The base and finger had mating slide surfaces which allowed the base and finger to move relative to one another. A screw was provided for effectuating the relative movement, thereby opening and closing the vice members to grip or to release the spring. A pin and interior slot arrangement provided a guide for the base and finger while the safety screw retained the finger on the base. At an end of the tool opposite the vice members, the tool body was formed in the shape of a socket post so that a socket wrench could be used to manipulate the tool.

In a second embodiment prior to the present invention, a ring encircled the base and finger in addition to the safety screw, and a key and keyway arrangement provided guidance for the movement of the base relative to the finger.

A disadvantage of the prior art is that a screw must first be manipulated to ensure the gripping of the tool upon the spring. Secondly, a second wrench must be utilized to grasp the head of the tool in order to then manipulate the spring.

SUMMARY OF THE INVENTION

The present invention overcomes a shortcoming of the prior art by providing one simple tool which may grasp the spring without the subsequent requirement of turning a screw and may also be utilized to torque the spring without being acted on by a second tool.

Further advantages of the present invention will be apparent to those skilled in the art as the workings of the invention are between explained in the accompanying drawings and detailed description.

DESCRIPTION OF THE PREFERRED EMBODIMENT

Figure 1:
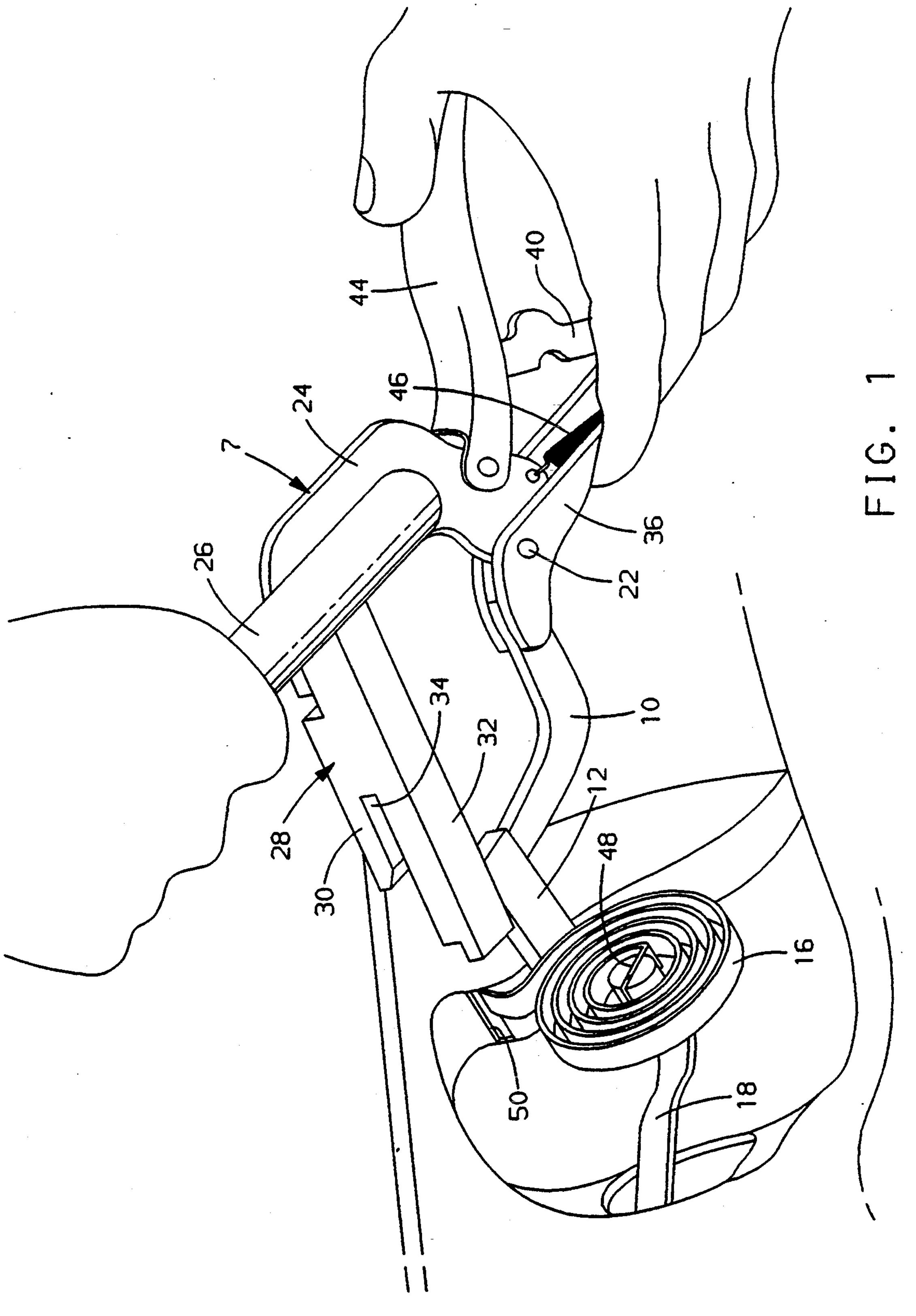
FIG. 1 is a perspective view of the inventive tool of the present invention being used by a tool operator and being unclamped and about to be clamped on a flat coil spring utilized in a counterbalancing function in a vehicle window regulator assembly.

Referring to FIGS. 1 through 6, the inventive tool 7 of the present invention has a first jaw 10. Jaw 10 at its end has a grip member 12 having an indention 14. Indention 14 grips the bottom portion of a flat spiral coil spring 16 used as a counterbalancing torsion spring for a window regulator assembly 18 (shown in FIGS. 1 and 2). Grip member 12 also has a generally horizontal offset 20 to allow three sides of the top portion of the spring 16 to be exposed. Vertically Pivotally mounted with respect to the first jaw 10 by a pin 22 is a second jaw 24. Second jaw 24, typically by welding, has connected thereto a handle 26 which, in a clamping position of the second jaw 24, extends generally horizontally, generally in an opposite orientation than a first handle 36.

Figure 2:
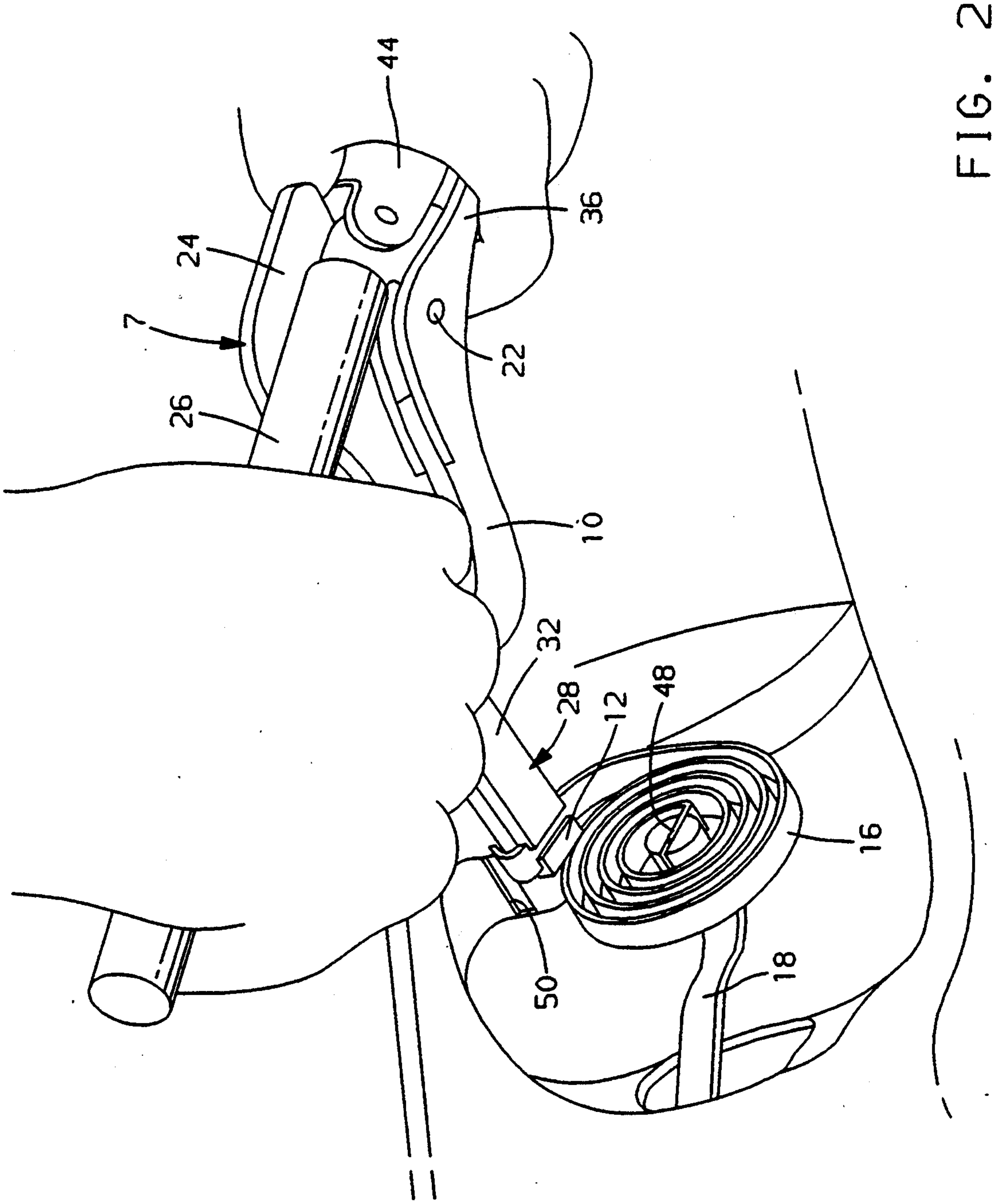
FIG. 2 is an illustration similar to that of FIG. 1 showing the inventive tool being clamped on the spring and the spring being torqued for removal.
Figure 3:
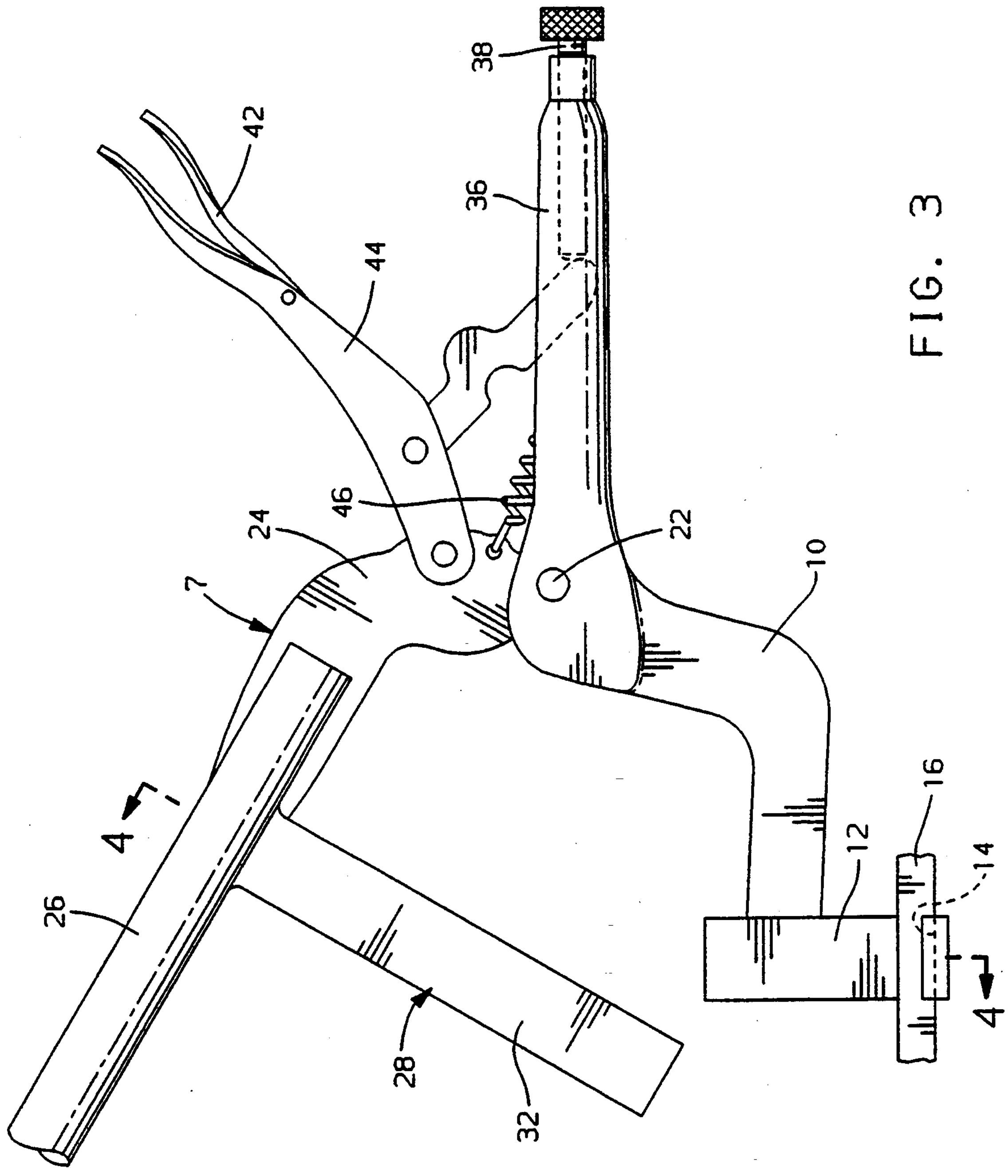
FIG. 3 is a front elevational view of the tool shown in FIG. 1.
Figure 4:
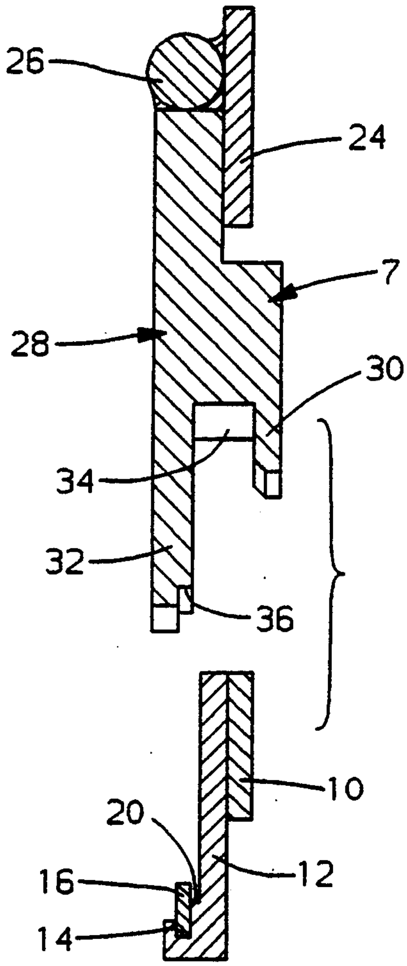
FIG. 4 is a view taken along line 4—4 of FIG. 3.
Figure 6:
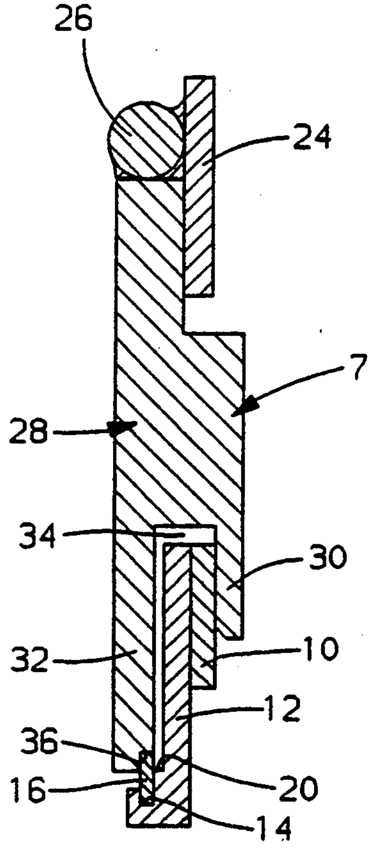
FIG. 6 is a view taken along line 6—6 of FIG. 5.
Figure 5:
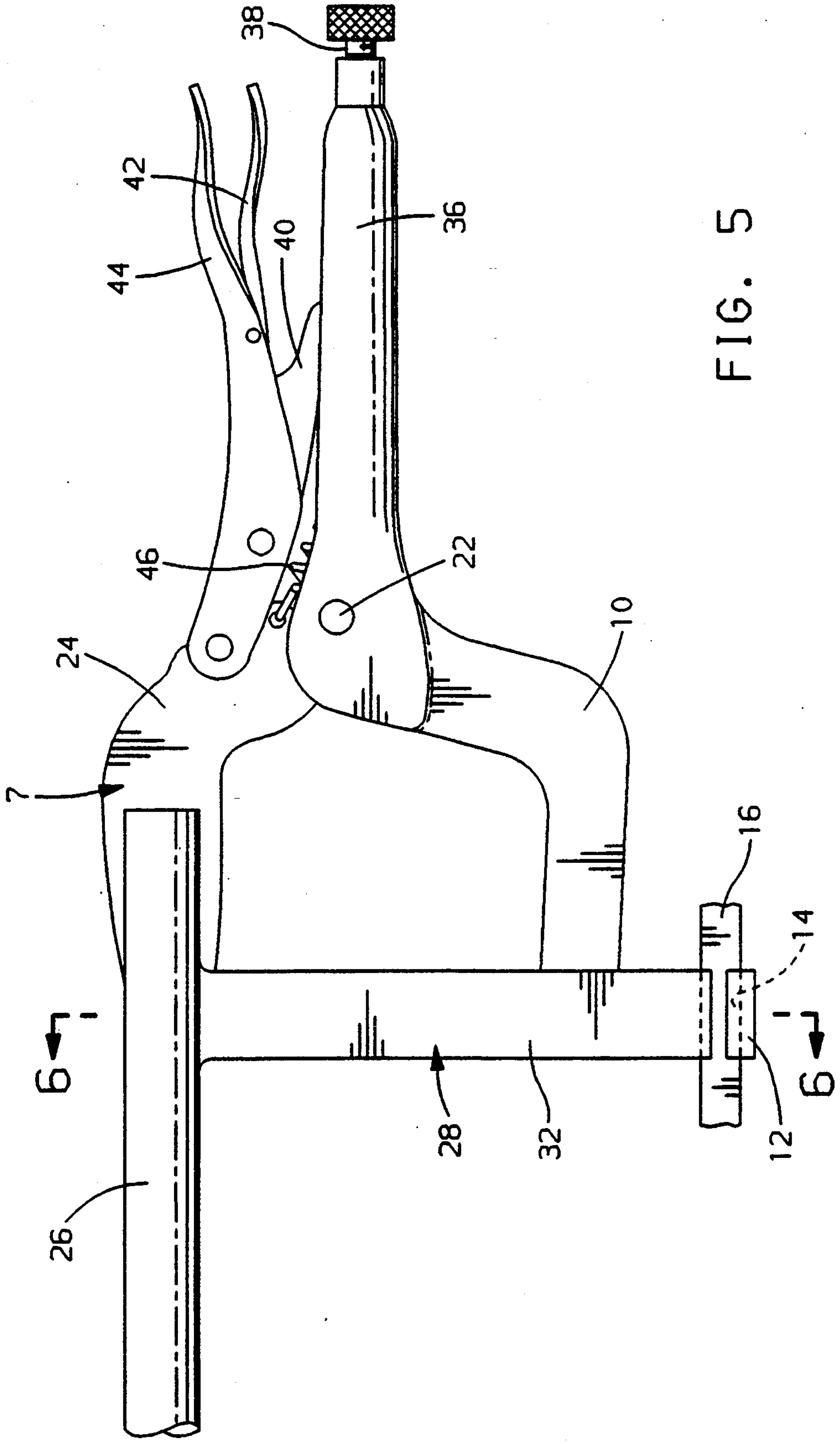
FIG. 5 is a front elevational view of the tool as it is shown in FIG. 2 clamped on the spring.

Extending downwardly from the second handle 26 and the second jaw 24 is a second gripping member 28. The second grip member 28 has a first finger 30 and a second finger 32 forming a pocket 34 therebetween. At the tip of finger 32, there is a milled slot 36 for contacting a top portion of the spring 16 along at least two sides. When the tool 7 is clamped on the spring 16 as best shown in FIGS. 2, 5 and 6, the first finger 30 provides lateral stability and location for the first grip member 12 as the first grip member 12 enters into the pocket 34.

The first jaw 10 is also connected with the generally horizontally extending first handle 36. The first handle 36 has threadably inserted therein a set screw 38 which is connected with a stud partially concealed within the handle 36, which acts as a reaction or set member for a link 40. Links 40, 42 and 44 along with handle 36 and jaws 10 and 24 operate generally like a vice grip such as one manufactured by the Peterson Manufacturing Company of DeWitt, Nebr. A spring 46 biases the second jaw 24 to a nonengaging position. Adjustment of set screw 38 allows the tool 7 to be utilized for coils of different height for various window regulator assemblies.

In operation, the tool 7 as shown in FIG. 1 is brought within the environment of the window regulator assembly 18. Typically, an extreme end of the spring 16 is positioned within a slot 48 of the window regulator assembly. The opposing extreme end of the spring 16 will typically be captured within a slot 50 of the vehicle door housing. The tool 7 will be positioned to place the first gripping member underneath the spring 16, and the second handle 26 will be utilized to move the second gripping member into position, capturing the spring 16 between itself and the first gripping member 12. The operator will then pivot link 44 toward the handle 36, thereby locking the jaws 10, 24 on the spring 16. The coil spring 16 may then be safely manipulated to be removed from the slot 50 and then lifted up to effect removal. Installation will be the same as above described. However, the operations will be reversed.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A spiral coil spring installation and removal tool for installing and removing vehicle door flat spiral coil springs comprising:

a first jaw having a grip member with an indention for gripping a bottom portion of a flat spiral coil spring, the grip member also having a generally horizontal offset to allow three sides of a top portion of the flat spiral coil spring to be exposed;

a first handle projecting generally horizontally connected with the first jaw;

a second jaw vertically pivotally mounted with respect to the first jaw for clamping the spring from above the spring, the second jaw having a second gripping member with a first finger and a second finger forming a pocket therebetween the fingers, the tip of the second finger having a slot for contacting the top portion of the spiral coil spring along at least two sides, and the first finger providing lateral stabilization for the first grip member whenever the first grip member enters into the pocket of the first and second fingers of the second grip member;

a spring connected to the first handle and the second jaw to bias the second jaw into a nonclamping position with the spiral coil spring;

vice grip means to lock the second jaw in a clamping position about the spiral coil spring and being adjustable to set the distance between the first and second jaws when the first and second jaws are gripping the spiral coil spring; and a second handle projecting generally horizontally opposite the first handle connected to the second jaw, allowing an operator to impart torsion to the coil spring in cooperation with the first handle.

* * * * *